United States Patent [19]

Vegh

[11] Patent Number: 5,540,195
[45] Date of Patent: Jul. 30, 1996

[54] VUKA TWO-STROKE ENGINE

[76] Inventor: Marijan Vegh, 21 Bergamot Ave. #2, Etobicoke, Ontario, Canada, M9W 1 W1

[21] Appl. No.: 524,632

[22] Filed: Sep. 7, 1995

[51] Int. Cl.⁶ .................................................. F02B 75/20
[52] U.S. Cl. ........................................ 123/65 S; 123/58.6
[58] Field of Search ................................ 123/73 F, 65 S, 123/58.5, 58.6

[56] References Cited

U.S. PATENT DOCUMENTS

| | | | |
|---|---|---|---|
| 2,384,309 | 9/1945 | Jordan | 123/655 |
| 2,722,924 | 11/1955 | Hedges | 123/58.5 |
| 3,301,237 | 1/1967 | Wolf | 123/58.5 |
| 4,781,153 | 11/1988 | Hooper | 123/65.5 |

Primary Examiner—David A. Okonsky

[57] ABSTRACT

An improved two-stroke internal combustion engine utilizing a vacuum chamber to create vacuum, which sucks the exhaust out from the combustion chamber, and forces the charge into it.

1 Claim, 1 Drawing Sheet

5,540,195

VUKA TWO-STROKE ENGINE

BACKGROUND OF THE INVENTION

The present two-stroke internal combustion engine utilizes the crankcase pumping chamber which warms the charge, or depends on a blower.

The scavenging by the charge causes its mixing with the exhaust.

Furthermore, the expelling of the exhaust directly through the exhaust port is noisy.

SUMMARY OF THE INVENTION

It is an object of the present invention to develop a two-stroke engine which will give a much higher torque at lower speeds, and can be utilized for automobile travel and other means of driving.

The present invention utilizes no muffler, no blower, nor supercharger, is far less noisy, smogfree, economical.

DETAILED DESCRIPTION OF THE DRAWING

Figure 1:
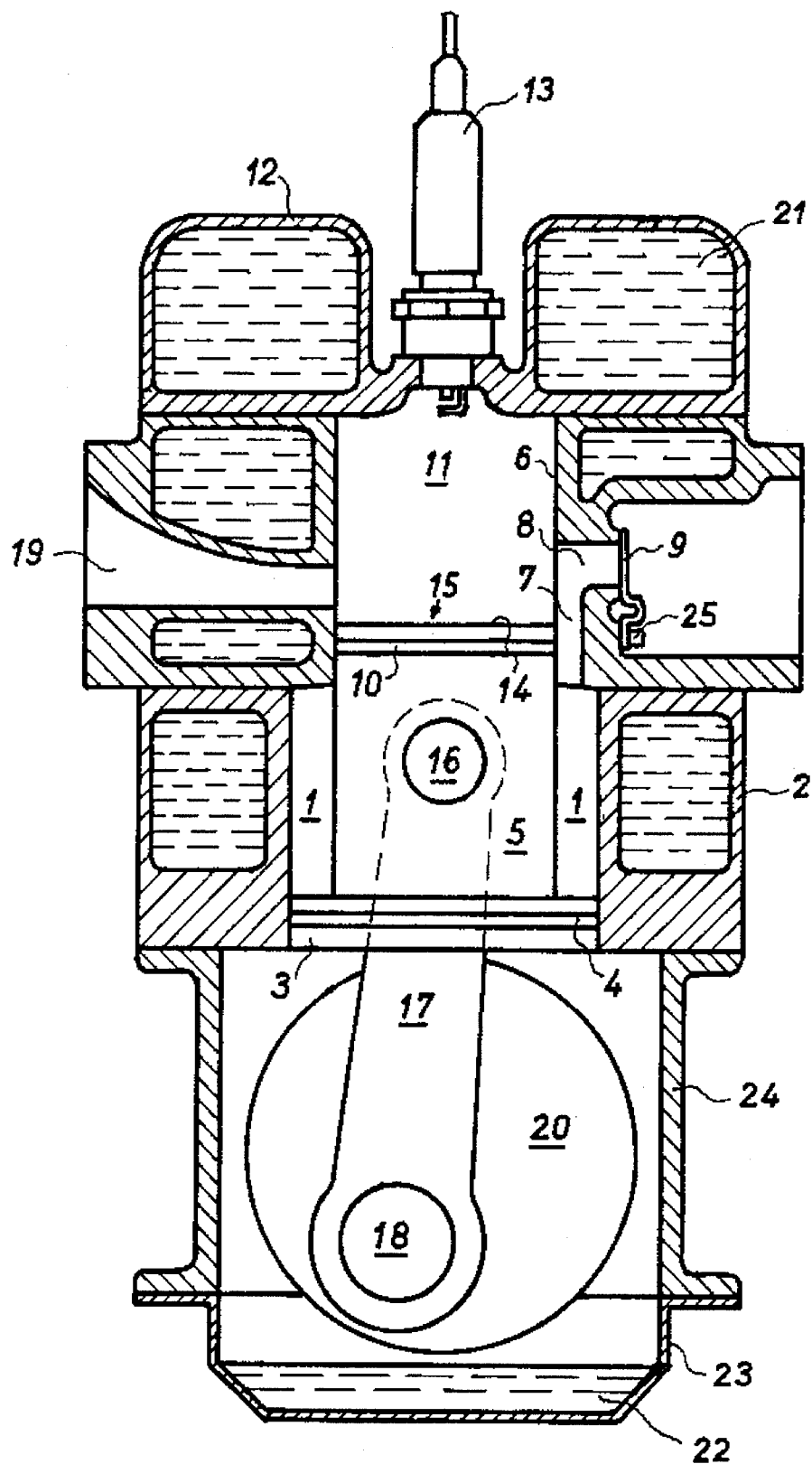
FIG. 1 is a cross-sectional view of the engine taken through its vertical centre line.

Referring to FIG. 1, there is shown the vacuum chamber 1, closed by the vacuum cylinder 2, the larger piston end 3, the piston ring 4, the piston skirt 5, the combustion cylinder 6, the transfer port 7, the exhaust port 8, the irreversible valve 9, the piston ring 10.

The combustion chamber 11 is closed by the cylinder head 12, the spark plug 13, the piston head 14, the piston ring 10, the combustion cylinder 6.

The spark plug 13, connected with a ignition system (not shown), ignites the fuel/oil/air charge, causing an explosion that forces the piston 15 down, which is converted by the piston pin 16, the connecting rod 17, and the crankshaft 18 into circular motion.

The piston 15 downward motion causes vacuum in the vacuum chamber 1, which closes the irreversible valve 9, and sucks the exhaust, when the piston skirt 5 releases the transfer port 7, and forces the fuel/oil/air charge from a carburetor (not shown) into the combustion chamber 11, when the piston skirt 5 releases the inlet port 19.

The flywheel 20 forces the piston 15 up, compressing the fuel/oil/air charge in the combustion chamber 11.

The piston 15 upward motion causes pressure in the vacuum chamber 1, which opens the irreversible valve 9, and expels the exhaust out.

The whole process repeats.

The irreversible valve 9 is a spring sheet, screwed by the, screw 25 on the exhaust port 8.

The engine is cooled by the fresh fuel/oil/air charge, the water jackets 21, and the splashing oil 22, from the oil sump 23.

The piston 15 is lubricated by the fuel/oil/air charge. The rest of the moving parts is lubricated by the splashing oil 22, from the oil sump 23 closing the crankcase 24.

I claim:

1. A two-cycle internal combustion engine comprising:

at least one cylinder with a combustion section and a pumping section, the combustion section having a selectively smaller diameter than a diameter of the pumping section;

a stepped piston having a combustion section with sealing means in sliding contact with inside walls of the combustion section of the cylinder and a pumping section with sealing means in sliding contact with inside walls of the pumping section of the cylinder;

at least one inlet port located in the inside wall of the combustion section and in communication with an inlet passage;

at least one exhaust port located in the inside wall of the combustion section and in communication with an exhaust passage;

a one-way valve in the exhaust passage preventing reverse flow towards said combustion section;

at least one transfer passage connecting said exhaust passage and said pumping section and in communication with the exhaust passage upstream of said one-way valve;

such that exhaust is drawn from the combustion section into said pumping section through said transfer passage as said stepped piston is expanding said pumping section;

said stepped piston combustion section having an upper surface which controls the opening and closing of said inlet and exhaust ports such that the exhaust is expelled from said pumping section, through said transfer passage and into said exhaust passage, after said exhaust port is closed.

* * * * *